Aug. 11, 1936.　　　L. S. TWOMEY　　　2,050,511
METHOD OF SEPARATING AND PURIFYING GASES
Filed May 9, 1934　　　3 Sheets-Sheet 1

LEE S. TWOMEY
INVENTOR
ATTORNEY

LEE S. TWOMEY
INVENTOR
ATTORNEY

EFFECTS OF TEMPERATURE AND PRESSURE ON BLUE GAS FREED FROM CO₂ CONTAINING HYDROGEN 51.6% CARBON MONOXIDE 45.3% NITROGEN 3.1%.

EFFECT PRODUCIBLE BY METHANE COOLING.

| COMPRESSION PRESSURE ON BLUE GAS. | PRESSURE ON EVAPORATING METHANE | | | | |
|---|---|---|---|---|---|
| | 1.36 ATM. | 1.0 ATM. | 0.5 ATM. | 0.2 ATM. | |
| | TEMRERATURE OF EVAPORATING METHANE | | | | |
| | 116° K | 112° K | 104° K | 95° K | |
| | NITROGEN AND CARBON MONOXIDE IN PRODUCT HYDROGEN. | | | | |
| 10 ATM. | 3.1% | 3.1% | 3.1 | 3.4 | NITROGEN |
| | 45.3% | 45.3% | 45.3 | 36.0 | CARB. MON. |
| 20 ATM. | 3.1% | 3.1 | 3.5 | 4.3 | NITROGEN |
| | 45.3 | 45.3 | 35.0 | 18.0 | CARB. MON. |
| 30 ATM. | 3.1 | 3.3 | 4.0 | 4.7 | NITROGEN |
| | 45.3 | 40.0 | 23.3 | 12.0 | CARB. MON. |
| 40 ATM. | 3.5 | 3.7 | 4.3 | 4.8% | NITROGEN |
| | 37.5 | 30.0 | 17.4% | 9.0% | CARB. MON. |
| 50 ATM. | 3.7 | 3.9 | 4.5% | 5.0% | NITROGEN |
| | 30.0 | 25.0 | 14.0% | 7.2% | CARB. MON. |

EFFECT PRODUCIBLE BY NITROGEN COOLING.

| COMPRESSION PRESSURE ON BLUE GAS. | PRESSURE ON EVAPORATING METHANE | | | | | |
|---|---|---|---|---|---|---|
| | 4 ATM. | 1.5 ATM. | 1.0 ATM. | 0.5 ATM. | 0.2 ATM. | |
| | TEMPERATURE OF EVAPORATING METHANE | | | | | |
| | 91° K | 81° K | 77° K | 72° K | 66° K | |
| | NITROGEN AND CARBON MONOXIDE IN PRODUCT HYDROGEN | | | | | |
| 10 ATM. | 3.9% | 4.8% | 5.0 | 5.0 | 2.0 | NITROGEN |
| | 26.0% | 10.0% | 7.0 | 3.0 | 1.2 | CARB. MON. |
| 20 ATM. | 4.6% | 5.2 | 5.3 | 2.5 | 1.0 | NITROGEN |
| | 13.0 | 5.0 | 3.5 | 1.5 | 0.6 | CARB. MON. |
| 30 ATM. | 4.9 | 5.0 | 3.3 | 1.7 | 0.7 | NITROGEN |
| | 8.7 | 3.3 | 2.3 | 1.0 | 0.4 | CARB. MON. |
| 40 ATM. | 5.1 | 3.8 | 2.5 | 1.2 | 0.5 | NITROGEN |
| | 6.5 | 2.5 | 1.8 | 0.8 | 0.3 | CARB. MON. |
| 50 ATM. | 5.2 | 3.0 | 2.0 | 1.0% | 0.3% | NITROGEN |
| | 5.2 | 2.0 | 1.4 | 0.6% | 0.2% | CARB. MON. |

FIG.3

LEE S. TWOMEY
INVENTOR

Patented Aug. 11, 1936

2,050,511

UNITED STATES PATENT OFFICE 2,050,511

METHOD OF SEPARATING AND PURIFYING GASES

Lee S. Twomey, Vista, Calif.

Application May 9, 1934, Serial No. 724,699

4 Claims. (Cl. 183—115)

The object of my invention is to provide means and a method for separating mixtures of gases into their constituents. The general method employed includes the old and well known step of cooling the gas to a temperature at which one or more of its constituents liquefies while at least one of the constituents remains gaseous, followed by a separation of the liquid from the gaseous product. With this method I have combined certain steps which materially reduce the amount of power required to produce the cooling effect, and other steps which increase the sharpness of the separation and permit a more complete separation of the condensible from the incondensible gases than has heretofore been possible.

While no restriction is placed on the use of the method and apparatus hereinafter disclosed, it is directed primarily to the purification of hydrogen and to the quantity production of commercially pure or of highly purified hydrogen from such mixtures as "blue" water gas, of which the following is a typical analysis:

| | Per cent |
|---|---|
| Hydrogen | 49 |
| Carbon monoxide | 43 |
| Carbon dioxide | 4 |
| Methane | 1 |
| Nitrogen | 3 |

The following description refers to the attached drawings which is a diagrammatic vertical section of a suitable form of apparatus for performing the method steps. In this description, for the purpose of illustration, the gas fed to the apparatus will be considered to be the blue gas above referred to.

Fig. 3 is a table indicating certain effects of temperature and pressure in changing the composition of the above blue gas.

Figure 1:
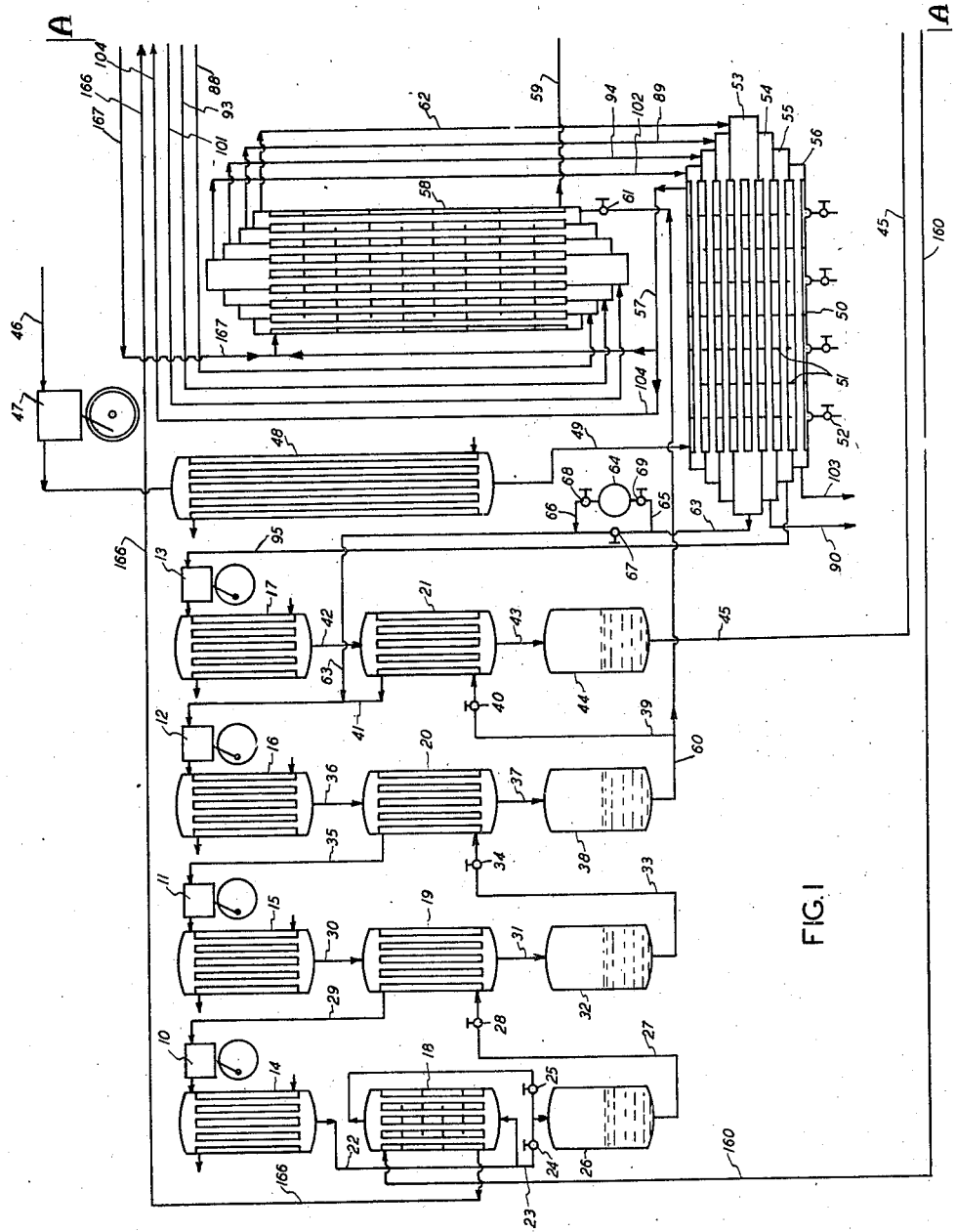
Figs. 1 and 2 represent respectively the left and right halves of the complete apparatus, which may be seen as a whole by joining the sheets on the line A—A.
Figure 2:
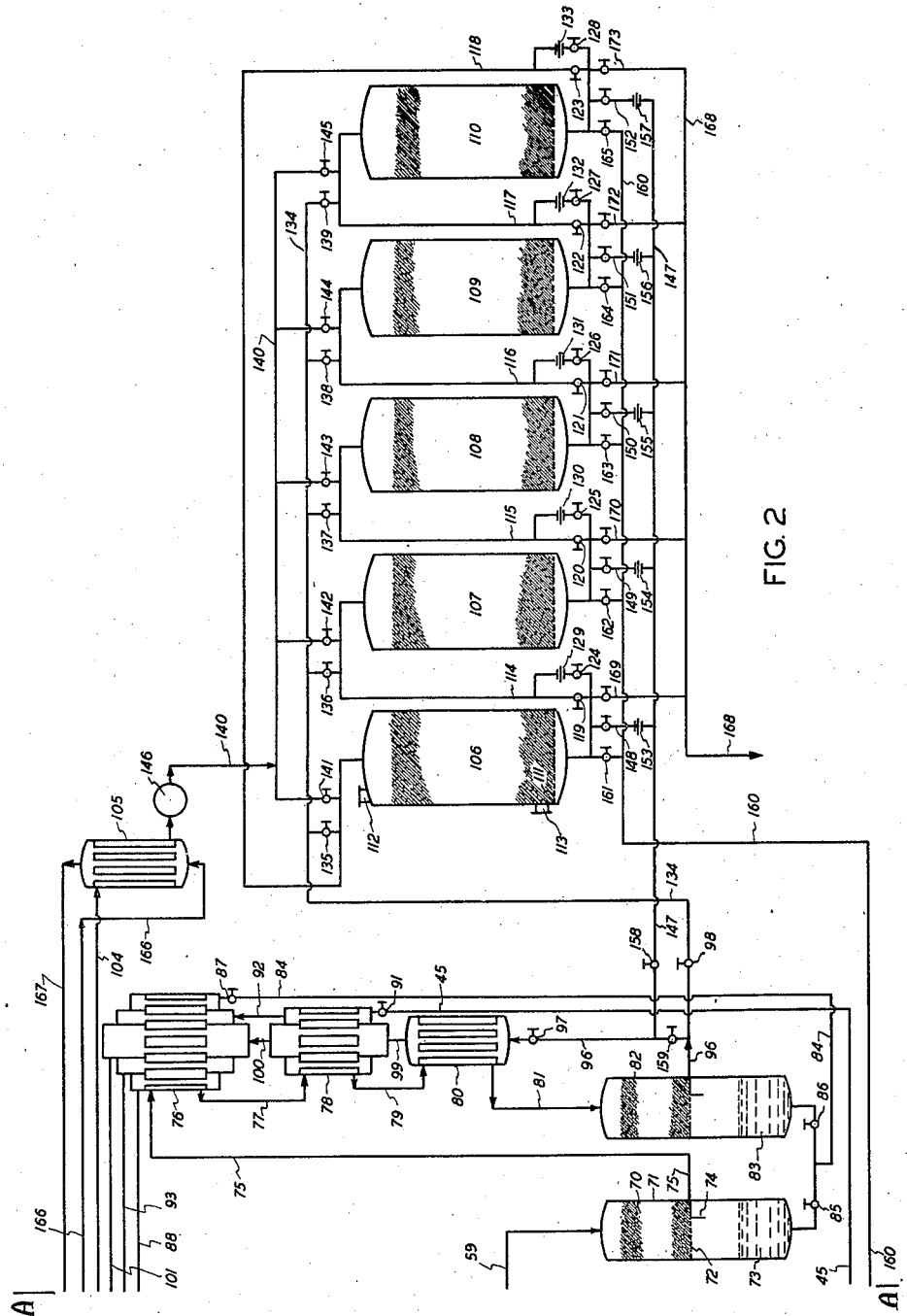

Referring to Figs. 1 and 2 of the drawings: 10, 11, 12, and 13 are compressors for ammonia, ethylene, methane, and nitrogen respectively. These compressors deliver their respective compressed gases into means for removing the heat of compression and returning the several gases to atmospheric temperature. Such means are illustrated at 14, 15, 16, and 17 as tubular coolers having inlets and outlets for water flowing around the tubes, but any preferred form of atmospheric-temperature cooler may be used.

These four primary coolers deliver their respective products into secondary tubular units 18, 19, 20, and 21, in which they are further cooled as will be described.

Gaseous anhydrous ammonia is raised by compressor 10 to a pressure of about 10 atmospheres absolute at which pressure it condenses in water cooler 14, the liquefied gas passing through pipe 22 into secondary cooler 18 where the temperature of the liquid is reduced below atmospheric by heat interchange against cold blue gas produced in the absorber unit later to be described. As this cooling gas may not be available at all times, a crossover pipe 23 and diversion valves 24 and 25 are provided for cutting out cooler 18. The liquefied ammonia, which may or may not be supercooled, collects in a receiver 26.

From this receiver a stream of liquid ammonia passes through pipe 27 to an expansion valve 28 by which it is admitted to the shell of condenser 19, which is maintained at substantially atmospheric pressure (say from 0# to 5# gauge). At this pressure the ammonia vaporizes in withdrawing heat from and condensing compressed ethylene flowing through the tubes, and the resultant ammonia gas returns through pipe 29 to the suction of compressor 10 at substantially atmospheric temperature and pressure, thus completing the ammonia cycle.

Assuming a cooling water temperature of 20° C. (293° K.) and a lag of 5° C. due to imperfect interchange, the liquid ammonia will collect in receiver 26 at 298° K., at which temperature its vapor pressure is 10 atm. absolute. On entering cooler 19 its temperature drops to its boiling point at the pressure carried, being 240° K. at 0# and 247° K. at 5# gauge. If interchange 18 is in operation, the temperature of the ammonia in receiver 26 will be lowered and the condensing pressure and the power load on compressor 10 will be reduced. The expansion temperatures, in cooler 19, will not be altered.

Gaseous ethylene is raised by compressor 11 to a pressure of about 22 atm. absolute, is brought back to atmospheric temperature in cooler 15 and passed through pipe 30 into the tubes of cooler 19, where it is further cooled and is condensed by evaporating ammonia. The liquefied ethylene passes through pipe 31 into a receiver 32. From this receiver a stream of ethylene passes through pipe 33 to an expansion valve 34 by which it is admitted to the shell of condenser 20, which is maintained at substantially atmospheric pressure (say from 0# to 5# gauge). At this pressure the ethylene vaporizes in withdrawing heat from and condensing compressed methane flowing through the tubes, and the resultant ethylene gas returns through pipe 35 to the suction of compressor 11 at substantially atmospheric temperature and pressure, thus completing the ethylene cycle.

Assuming a 5° temperature lag in condenser 19, as before, the liquid ethylene will collect in receiver 32 at 245° to 252° K., at which temperatures its vapor pressure is from 20 to 24 atm. On entering condenser 20 its temperature drops to its boiling point at the pressure carried, being 168° K. at 0# and 173° K. at 5# gauge.

Gaseous methane is raised by compressor 12 to a pressure of about 28 atm. absolute, is brought back to atmospheric temperature in cooler 16 and passed through pipe 36 into the tubes of cooler 20 where it is further cooled and is condensed by evaporating ethylene. The liquefied methane passes through pipe 37 into a receiver 38. From this receiver a stream of methane passes through pipe 39 to an expansion valve 40 by which it is admitted to the shell of condenser 21, which is maintained at substantially atmospheric pressure (say from 0# to 5# gauge). At this pressure the methane vaporizes in withdrawing heat from and condensing compressed nitrogen flowing through the tubes, and the resultant methane gas returns through pipe 41 to the suction of compressor 12. This completes the direct methane cycle, but there is a secondary cycle in which methane is withdrawn from the receiver and returned to the compressor for the intermediate cooling of the blue gas, as will be described.

Assuming a 5° temperature lag in condenser 20, the liquid methane will collect in receiver 38 at from 173° to 178° K. at which temperatures its vapor pressure is from 25 to 30 atm. On entering condenser 21 its temperature drops to its boiling point at the pressure carried, being 112° K. at 0# and 116° K. at 5# gauge.

Gaseous nitrogen is raised by compressor 13 to a pressure of about 25 atm. absolute, is brought back to atmospheric temperature in cooler 17 and passes through pipe 42 into the tubes of cooler 21 where it is further cooled and is condensed by evaporating methane. The liquefied nitrogen passes through pipe 43 into a receiver 44. From this receiver a stream of liquid nitrogen is withdrawn through pipe 45 for use in another part of the system, as will be described.

Assuming a 5° temperature lag in condenser 21, nitrogen will collect in receiver 46 at from 117° to 121° K. at which temperature its vapor pressure is from 22 to 27 atm.

Describing now the flow of blue gas (or other gas to be treated) through the apparatus: raw gas at atmospheric temperature and pressure enters the system through pipe 46 and is raised by a compressor 47 to a pressure of, for example, 20 atm. absolute. The pressure at the ultimate point of pressure release may be of the order of 20 atm. plus pressure drop through the apparatus. As this pressure drop will vary with details of construction and with optional variations in operating method, the compressor pressure cannot be specified, and the release pressure of 20 atm. is a preference only and may be widely departed from.

The compressed gas passes through the tubes of a water cooler 48 in which the heat of compression is removed and the gas brought back to atmospheric temperature, and thence through pipe 49 into the shell of a dehydrating interchanger 50. If desired, the compressed gas may be passed through scrubbers or other means for removing any carbon dioxide which may be present in the raw gas before entering the interchanger.

This interchanger is of the well known horizontal type consisting of a bundle of tubes through which the cooling medium passes, these tubes being enclosed by a shell through which the blue gas passes. This shell is divided into a series of pockets by staggered baffles 51, by which the length of travel of the gas and its velocity over the tubes are increased, each pocket so formed being drained as required by means of a valve 52.

The tubes are divided into groups by means of headers at each end of the shell, the headers shown being concentrically arranged as indicated at 53, 54, 55, and 56, and through these groups of tubes are passed various gases which have been chilled and partially rewarmed in later stages of the operation. The temperature of these gases is such that the blue gas, leaving the interchanger, is reduced to a temperature below the freezing point of water, and as this unit gradually becomes choked by the accumulation of ice, it should be provided in duplicate and with proper diversion pipes and valves to permit one unit to be thawed out while its duplicate is in operation.

The dehydrated blue gas leaves interchanger 50 and passes through pipe 57 into the shell of an interchanger 58 which may be of the same general construction as interchanger 50 except that the water drains 52 are not required. In this interchanger it is further cooled against various gases which have been chilled and partially rewarmed in later stages of the operation, and also by the evaporation of liquid methane.

In this interchanger the gas may be cooled to such point that the carbon monoxide content is partly condensed. This cooling effect is produced by interchange and by the evaporation of liquid methane which is drawn from receiver 38 through pipe 60 and an expansion valve 61 into one of the tube groups of the interchanger, which is maintained at or below atmospheric pressure. At these pressures the liquid methane vaporizes in withdrawing heat from the blue gas, thus causing the condensation of carbon monoxide. The resultant methane gas passes through pipe 62 to a tube group of dehydrating interchanger 50 and passes finally through pipe 63, at substantially atmospheric temperature and at or below atmospheric pressure, to pipe 41 and thus to the suction of compressor 12.

At 0# gauge pressure methane boils at 112° K., at 5# gauge at 116° K. With care in the design of interchanger 58 the effluent gas may be cooled to within 2° C. of these temperatures, or from 114° K. to 118° K. At these temperatures the vapor pressures of carbon monoxide are 13 atm. and 17 atm. respectively, and at an operating pressure of 20 atm. no condensation of carbon monoxide in the gas entering the condenser exceeded 65% and 85% respectively. At higher compressions and at lower back pressures on the compressor the concentration of carbon monoxide in the gas delivered by interchanger 58 would be as shown by the table in Fig. 3.

As it may under some conditions be undesirable to pass the entire condensing load to the final interchangers 76, 78, and 80 and may also be undesirable to largely increase the compression of the blue gas, I prefer in such cases to introduce a secondary exhauster into the course of pipe 63. Such exhauster is indicated at 64, a branch suction 65 and a branch discharge 66 being connected into pipe 63 on opposite sides of a stop valve 67. Valves 68 and 69 provide for cutting out the exhauster when valve 67 is opened to connect compressor 12 direct to interchanger 58. The use of an auxiliary exhauster provides for any desired reduction in temperature of interchanger 58 without operating compressor 12 at a diminished back pressure, it being assumed that the exhauster will discharge at a pressure equal to the desired suction pressure on methane compressor 12.

From interchanger 58 the cooled blue gas, which may contain more or less condensate of carbon monoxide, passes through pipe 59 to a mist extractor 70 which may be of any preferred form. As illustrated, the upper portion of the shell is filled with broken coke or other fragmental or shaped inert material 71 resting on a screen or perforated plate 72. This device, which is well known, is highly effective for the separation of the fine mist of condensate which forms on cooling the gas to the condensing point of carbon monoxide.

The liquid thus separated from the gas collects in a pool 73 in the bottom of the extractor while the gas is withdrawn from beneath a shield 74 and passes through pipe 75 to the shell of an interchanger 76 in which it is counterflowed against cold gaseous nitrogen and hydrogen produced by succeeding operations and is cooled by evaporating carbon monoxide, as will be described. This interchanger is provided with baffles and may be of the same general form as interchanger 58. It then passes through pipe 77 to the shell of an interchanger 78 in which it is counterflowed against and cooled by gaseous hydrogen and evaporating liquid nitrogen, and then through pipe 79 to an interchanger 80 in which it is counterflowed against and cooled by expanding gaseous hydrogen. By this successive cooling it is reduced to a temperature at which most of the carbon monoxide is condensed and largely in the form of a mist suspended in the residual hydrogen.

This mist passes through pipe 81 to a second mist extractor 82, in which the liquid collects as a pool 83. The liquid carbon monoxide, together with some nitrogen which may condense with it, collects in pools 73 and 83 and is withdrawn through a branched pipe 84 provided with diversion valves 85—86 and an expansion valve 87 by which it is admitted to one of the tube groups of interchanger 76. This space being maintained at approximately atmospheric pressure, the mixed carbon monoxide-nitrogen liquid evaporates and is reduced to approximately its boiling point at 1 atm. absolute or 82° K., and the blue gas passes out of this interchanger at a temperature 1° or 2° C. higher.

From interchanger 76 the gaseous carbon monoxide passes through pipe 88 to interchanger 58 where it is counterflowed against compressed and partially cooled blue gas, then through pipe 89 to the dehydrating interchanger 50 against compressed blue gas, finally leaving the system through pipe 90 at substantially atmospheric temperature and pressure.

One of the groups of tubes of interchanger 78 is supplied with liquid nitrogen drawn from receiver 44 through pipe 45 which is provided with an expansion valve 91. This space is maintained at a pressure which will vary with the cooling effect available from the expansion of the residual hydrogen in the same interchanger, this effect being variable with options as to the operation of further parts of the system. The minimum pressure in this group of tubes will ordinarily be of the order of 2/10 atm. absolute, at which nitrogen boils at 66° K., the freezing point of carbon monoxide, and it may be very much higher. The expanded gaseous nitrogen passes through pipe 92 to interchanger 76 then through pipe 93 to interchanger 58, then through pipe 94 to dehydrating interchanger 50, and through pipe 95 to the suction side of compressor 13 at substantially atmospheric temperature.

The gas removed from extractor 82 passes through pipe 96 into interchanger 80 and enters the tubes in an expanded condition and consequently at a temperature below that at which it is freed from condensate in separator 82. This expansion is produced at an expansion valve 97 (valve 159 being open) in case stop valves 98 and 158 in the pipes leading to the absorber set are closed and that apparatus inoperative. By interchange in this unit the final temperature of the blue gas entering separator 82 is so reduced as to condense further quantities of carbon monoxide as already described.

The hydrogen passing through the tubes of interchanger 80 passes through pipe 99 to interchanger 78, then through pipe 100 to interchanger 76, then through pipe 101 to interchanger 58, then through pipe 102 to dehydrating interchanger 50, and is finally withdrawn from the system through pipe 103 at substantially atmospheric temperature and pressure as the purified hydrogen product. The degree of purity will vary with certain options as to manipulation, not yet described.

Instead of taking the product hydrogen direct from the expansion step it may be submitted to contact with solid adsorbents by which the highest degree of purity is produced.

Describing first the absorbers, these are indicated in the drawings as vertical cylinders numbered 106 to 110 inclusive. These cylinders are filled with a desired solid absorbent, such for example as activated charcoal, this char resting on a screen or other support 111. These supports, and appropriate filling and discharge manholes 112 and 113 are shown on one cylinder only, but all are equipped in the same manner.

The five absorbers are connected in series by pipes numbered 114 to 118 inclusive, these pipes being provided with valves 119—122. It will be noted that pipe 118 from the bottom of cylinder 110 leads to the top of cylinder 106; so that the series is cyclic.

Around each of these valves is connected a shunt pipe 124—128 provided with a valve having the same number, and in each of these pipes is placed an orifice fitting 129—133 having means for adjusting or changing the size of the orifice.

A pipe 134 is connected to cold hydrogen outlet pipe 96 and is branched at 135—139 to admit hydrogen to the top of any one of the absorbers, each branch being provided with a valve of the same number.

A pipe 104 is extended from a connection with dehydrated blue gas pipe 57 to an interchanger 105 and from this interchanger an outlet pipe 140 is branched at 141—145 to admit blue gas into the top of any one absorber, each branch having a valve. A rotary blower or other low head gas pump 146 may be placed in pipe 140 to urge the requisite gas supply to and through the absorber.

A pipe 147 provided with a valve 158 is branched from pipe 96 and is itself branched at 148-152 to permit cold hydrogen to flow from the lower end of any cylinder into interchanger 80. For diverting the gas leaving separator 82 through pipe 134 to an absorber and back to interchanger 80, pipe 96 is provided with a valve 159 between the two branches.

Each of the branches 148-152 is further provided with an adjustable orifice fitting 153-157 as above described.

A pipe 160 is connected to the upper end of the shell of ammonia interchanger 18, and is branched at 161-165 to permit blue gas used in heating to be withdrawn from the bottom of any one cylinder, each of these branches being provided with a valve. From the lower end of interchanger 18 a pipe 166 conducts the warmed gas to interchanger 105 from which it flows through pipe 167 to the blue gas inlet of interchanger 58.

A pipe 168 is branched at 169-173 to permit warm hydrogen to be withdrawn from any one of the absorbers, each branch having a valve of the same number. Purified hydrogen is vented from the system at substantially atmospheric temperature and either at system pressure or atmospheric pressure as may be preferred.

It is well known that when a mixture of two gases or vapors having different liquefying temperatures at any given pressure is contacted with certain solid adsorbents, the more readily condensible constituent is selectively adsorbed by the solid and may thus be partially or completely removed from the less readily condensible. It is also well known that the adsorption of the more readily condensible matter and its retention in the adsorbent solid is facilitated to some extent by increase in pressure and, usually to a greater extent, by decrease in temperature, and that the adsorbed matter may be removed from the solid adsorbent by heating it to a temperature materially above the boiling point of the adsorbed matter at the existing pressure.

This is commercial practice in the separation of liquid hydrocarbons from natural gas by passing the gas, usually at substantially atmospheric temperature and pressure, through columns of adsorbent charcoal and intermittently removing the absorbed liquids from the char by heating it with direct steam.

In the present invention I have applied these well known principles to the purification of a gas (as for example hydrogen) from gases having higher boiling points (as for example nitrogen and carbon monoxide) by the provision of means for cooling the mixed gases to very low temperatures, of means for removing the adsorbed impurities from the charcoal, of means for precooling the absorbers and of means for regenerating the extremely low temperatures employed without losing any of the cooling effect residing in the cold intermediate or final products. By these means the known theories of selective adsorption are made available for the commercial purification and separation of the so-called "fixed" gases at reasonable costs, an end not heretofore attained.

Before describing the operation of the absorber unit it should be predicated that the operation is essentially intermittent and that each cylinder is used successively in three operative stages, the starting point of the operation passing from one cylinder to the next in order as represented in the drawings, reading to the right.

The three stages of the operation are as follows: first, absorption, in which clean, precooled charcoal is contacted with a flow of the gas to be purified, this stage terminating when the charcoal has become saturated with impurities; second, the cleaning of the charcoal, herein termed "heating" in which the saturated char is heated to such temperature that the impurities are gasified and driven off; third, precooling, in which the clean char and its container are brought back to the temperature of the gas flow and thus fitted for reuse in the first stage.

For reasons which will appear, it is preferable to utilize at least two cylinders in series in each the first and third stages, and in the following description we will assume that cylinders 106 and 107 are in the first or absorbing stage, cylinders 108 and 109 are in the third or precooling stage, and cylinder 110 is in the second or heating stage. It will be understood that in the description following the three stages of absorption, heating, and cooling occur simultaneously in the group of absorbers and successively in any one, and that as soon as one stage is completed in any one absorber, that unit is ready to be moved up to the beginning of the next stage. All valves are assumed to be closed except when stated to be open.

Starting from separator 82, in which a continuous supply of cold hydrogen containing more or less carbon monoxide and nitrogen is available, and closing valve 159 to prevent this hydrogen from passing to interchanger 80, we open valve 98 allowing the hydrogen to pass under pressure through pipe 134 to valve 135 and thus into the top of cylinder 106. In this cylinder the nitrogen and carbon monoxide are at least partially absorbed from the hydrogen, which passes through pipe 114 and valve 119 to the top of absorber 107, in which any impurity escaping from absorber 106 is absorbed. While this operation is in progress, cylinders 108 and 109, which have been used and cleaned, are in progress of precooling and cylinder 110 is in progress of heating and cleaning, as will be described.

Unless the carbon monoxide content of the entering gas be very large the quantity of cold gas which may be passed through a single absorber before it becomes completely charged with impurities is much greater than the quantity required to cool a cleaned absorber from atmospheric temperature to the temperature of the cold gas.

As in the system here described, the gas which has passed through two absorbers is used to directly cool the next two cylinders, valve 120 in the direct line between cylinders 107 and 108 is left closed, but shunt valve 125 is opened, permitting gas to flow through orifice 130 into cylinder 108. At the same time valve 149 is opened permitting gas to flow through orifice 154 to the cold hydrogen discharge pipe 147. These orifices may be so proportioned in area that the quantity of cold gas passed into cylinder 108 is just sufficient to cool one cylinder in the minimum time required to charge one cylinder with impurities, and if in practice a greater time be taken to exhaust the absorbing cylinder, the shunt valve may be closed when cylinder 108 is completely cooled.

The flow of cold gas passing through orifice 130 to cylinder 108 is carried into cylinder 109 through valve 121 and pipe 116, and is finally removed from this cylinder through pipes 172 and 168 issuing from the latter as highly purified hydrogen at atmospheric temperature and pressure, the release from system pressure to atmospheric occurring in orifice 130.

The flow of cold gas passing out of cylinder 107 through valve 149 and orifice 154 returns to interchanger 80 through pipe 147 and valves 158 and 97, both of which are wide open. The expanded gas, at a somewhat reduced temperature, is interchanged against compressed blue gas in interchangers 80, 78, 76, 53, and 50, and finally passes out of the system through pipe 103 as highly purified hydrogen at substantially atmospheric temperature and pressure.

In this description the absorption is conducted under pressure and at the temperature at which the hydrogen leaves separator 82. It is possible to release the pressure at valve 98 instead of at the orifices, in which case the absorption is conducted at atmospheric pressure. This produces a lower temperature in the absorber than that available at high pressure and permits the use of absorbers designed for low pressures.

The use of cylinder 106 as the first absorber may be continued until traces of impurities begin to show at the outlet of absorber 107 or come to some predetermined proportion.

Simultaneously with the absorption in cylinders 106 and 107, cylinders 108 and 109 are being precooled and made ready for absorption.

The cold purified hydrogen passing through orifice 130 and pipe 115 into the top of cylinder 108 completes the cooling of the char in this cylinder and passes on through valve 121 and pipe 116 to cylinder 109, in which the precooling begins, this cylinder being the last to come out of the previous heating stage. From cylinder 109 the hydrogen passes out of the system as purified product hydrogen at substantially atmospheric temperature and pressure through valve 172 and pipe 168.

Simultaneously with absorption in 106 and 107, cylinder 110, which has become completely saturated in a previous cycle, is being heated for the purpose of cleaning. Blue gas is suitable for this purpose but it is not desirable to use the raw gas entering the system as it usually contains so much water vapor as to cause the accumulation of frost in the cold saturated charcoal.

We therefore start from pipe 57, which is constantly supplied with partly cooled and substantially dehydrated blue gas and pass this gas through pipe 104 to an interchanger 105 in which it is counterflowed against a warm gas and is brought up to atmospheric temperature. From this interchanger the blue gas passes through blower 146 and pipe 140 to branch pipe and valve 145 and into cylinder 110, which has just come out of the absorbing stage of the previous cycle.

From the bottom of 110 the blue gas is directed through pipe and valve 165 and pipe 160 to ammonia interchanger 18, in which any cooling effect due to subatmospheric temperature of the gas is useful for subcooling liquid ammonia and reducing the power load on compressor 10. From this interchanger the warm gas, carrying the impurities removed from cylinder 110, passes through pipe 166 to the lower end of interchanger 105 where it counterflows the cold blue gas from the dehydrating interchanger 50, and returns from interchanger 105 to interchanger 58 through pipe 167.

If desired, warm product hydrogen from pipe 103 may be used to replace warm blue gas in the above heating operation but as this step causes the contamination of the hydrogen, it would be necessary to return it to compressor 47 for retreatment and would thus reduce the pure hydrogen output.

The blue gas removes the impurities from the char in cylinder 110 by heating it to about atmospheric temperature, which is far above the critical temperatures of carbon monoxide and nitrogen. During the heating period the blue gas issuing from cylinder 110 is at first at the adsorption or minimum temperature, and the heating stage is complete when the temperature of the gas has risen to atmospheric. As this gas of variable temperature is interchanged against a stream of liquid entering the interchanger (18) at the maximum temperature of the gas, any heat absorbing capacity which it may possess at subatmospheric temperature is utilized in precooling the ammonia and reducing the average temperature of the contents of receiver 26, which should be of such capacity as not to permit its contents to fluctuate in temperature to any objectionable degree by reason of the variable temperature of the stream of ammonia entering it from interchanger 18.

The quantitative cooling effect of the returned blue gas cannot be predicted, except for a specific case, as it varies over a very wide range with variations in the proportion of impurities in the gas, the rate at which the cold absorber is heated and other factors. It may be greater than the ammonia stream required for refrigeration can absorb without freezing, and in such case it would be desirable to insert an interchanger similar to 18 in the ethylene cycle, as between 19 and 32, or even into similar positions in the methane and nitrogen cycles, thus gradually raising the temperature of the cold gas and distributing the cooling effect over a succession of refrigerants of increasing freezing points.

The heating stage terminates when absorber 110 is brought to atmospheric temperature at its lower end, at which time it is clean and ready for precooling.

When the three stages are (more or less simultaneously) completed, the sequence is moved one step to the right. That is to say, cylinder 106, which is now completely charged with impurities, is transferred to the heating stage, cylinder 108, which is now completely cooled, becomes the second absorber, and cylinder 110, which is now completely heated, becomes the second cylinder in process of cooling. To effect these changes the following valve manipulations are made.

Divert cold hydrogen from 106 to 107 by closing 135 and opening 136.

Divert cold hydrogen outlet from 107 to 108 by closing 149 and opening 150.

Divert point of pressure release from 107—108 to 108—109 by closing shunt valve 125 and opening shunt valve 126, also closing main valve 119 and opening 120.

Divert warm hydrogen outlet from 109 to 110 by closing 184 and opening 185.

Shut off flow of hydrogen from 106 to 107 by closing valve 121 and start flow from 109 to 110 by opening valve 122.

Divert heating gas from 110 to 106 by closing valves 145 and 165 and opening valves 141 and 161.

By using at least two cylinders in series in the absorbing stage a more complete utilization of the capacity of the char is effected than is possible with a single cylinder. As the char progresses toward saturation, its adsorption rate is progressively lowered and it is impossible to completely utilize the adsorptive value of a single body of char without very greatly lowering the flow rate of the gas being treated. The second adsorber, containing fresh char, effectively removes all impurities passing from the first cylinder as it approaches saturation, and permits the utilization of the entire adsorptive value of the first char body without retardation of the gas flow rate.

The desirability of using at least two cylinders in series in the precooling stage is based on somewhat different grounds. The existing conditions—direct contact of gas with the char, relatively high heat conductivity of the char and absence of convection in the interstices of a pack of granular solids—are ideal for rapid heat interchange in either direction between the solid and the gas. For this reason the cooling effect takes place, not through the entire length of the cylinder at once, but in a zone of relatively small depth which progresses through the cylinder which has been cooling for say half the time required for completion, the upper portion of the body of char is completely cooled to the minimum temperature, the lower portion is at its original (the maximum) temperature, and an intermediate zone is in progress of cooling, at the minimum temperature on its upper side and at the maximum temperature below.

The depth of this zone will vary with the conductivity of the char, the velocity of the cooling gas, the extent to which channeling occurs and other variables. It will be evident that, no matter what its depth, a single cylinder will discharge a gas of falling temperature during the time required for this zone to travel through the cylinder for a distance equal to its depth: i. e., the time required for the zone to pass out of the cylinder. It is equally evident that if the depth of this zone does not exceed the depth of the second absorber, the zone of changing temperature may be moved to such position in this second unit that the gas issuing from the first will be at one extreme of the temperature range while that issuing from the second is at the other extreme, thus providing for the complete cooling of the first body of char without discharging any gas of intermediate temperature.

In case the carbon monoxide content of the blue gas is so low that no condensate is producible by applying the methane cooling step to the blue gas under the operating conditions here described, this step may be omitted by cutting off the supply of methane to expansion valve 61. As methane refrigeration is materially cheaper than that produced by liquid nitrogen, it is desirable to utilize the higher temperature cooling in so far as it may be available in any specific case, and in such case the balance of cost between higher blue gas pressures and/or reduced expansion pressures on the methane on the one hand and an increased nitrogen consumption on the other will be a matter for calculation.

In some cases it may be desirable to omit the nitrogen cooling step. When operating in this manner, the methane interchanger 58 is maintained at a pressure of say 0.2 atm. absolute, at which methane boils at 95° K. and an outlet temperature of about 98° K. may be obtained. At this temperature the vapor pressure of carbon monoxide is 4.8 atm. absolute and a gas containing more than 9.6% of carbon monoxide would liquefy all excess over that quantity. The excess would have to be considerable to provide for the functioning of the next step, the reduction of the temperature of the gas to the boiling point of liquid carbon monoxide in interchanger 76. Assuming that the cooling effect of the expanded hydrogen would at least offset the lag in carbon monoxide interchange, the temperature of the gas entering separator 80 is 82° K. at which the vapor pressure of carbon monoxide is 1 atm. absolute and the proportion of carbon monoxide in the effluent gas at 20 atm. pressure is 5.0%.

This degree of fractionation is obviously of no value when considered as a means of purifying hydrogen, and as carbon monoxide has little present value other than as a fuel, this step alone would be without purpose. Under some conditions, however, it might be desirable in connection with the absorption step, as while the load thrown on the absorbers would be many times increased (in the ratio of 0.11 at 66° K. to 1.0 at 82° K.), the absorption step is relatively inexpensive as regards power consumption and maintenance and it might well be more economical in some instances to operate under an increased absorber load and a much decreased load on the refrigeration cycles.

I claim as my invention:

1. The method of separating a mixture of gases into desired and undesired fractions which comprises: cooling a stream of said mixture to a temperature at which the undesired fraction is partially condensed and at which the desired fraction remains gaseous; separating the condensate formed by said cooling from said stream; passing said stream successively through a first and a second permeable body of solid absorbent material, said bodies being precooled to a temperature not substantially above said condensation temperature; absorbing and retaining further quantities of the undesired fraction in the absorbent material of said first and second bodies, whereby the desired fraction is purified; dividing the effluent stream from said second body to form two lesser streams of said purified fraction; passing one of said lesser streams in heat interchange relation with said mixture stream to assist the cooling of said mixture and discharging said lesser stream from the system at substantially atmospheric temperature; passing the other of said lesser streams successively through a third and a fourth permeable body of solid absorbent material, said bodies being initially approximately free from the undesired fraction and at substantially atmospheric temperature; continuing the passage of last said lesser stream until said third body is cooled to substantially said condensation temperature and discharging last said stream from said fourth body at substantially atmospheric temperature.

2. A method substantially as and for the purpose set forth in claim 1, in which said mixture stream is raised to a material superatmospheric pressure prior to said cooling and said pressure is released to substantially atmospheric at substantially the point of efflux of said effluent stream from said second permeable body.

3. The method of separating constituents of a mixture of gases which comprises: cooling a stream of said mixture to a low subatmospheric temperature; passing a stream of said mixture through a precooled first body of solid absorbent material and absorbing and retaining in said body a constituent of said mixture; dividing said stream, withdrawing one portion of said stream from the system and utilizing said portion in first said cooling of said stream; passing the remaining portion of said stream without avoidably changing its temperature through a succeeding plurality of bodies of solid absorbent material initially at higher temperatures, whereby said bodies are precooled by the heat absorbing capacity of said remaining portion, and discharging said remaining portion from the system at a substantially constant higher temperature.

4. A method substantially as and for the purpose set forth in claim 3, in which one portion of said divided stream is passed through a plurality of initially warmer bodies in series, in which said passage is continued until the first body of said series is reduced to the desired temperature of precooling, and in which the first body when sufficiently precooled is withdrawn from said series and an additional warm body is added to said series at the discharge end thereof.

LEE S. TWOMEY.